July 26, 1932. A. J. APP 1,869,234

PAN

Filed March 29, 1930 2 Sheets-Sheet 1

Andrew J. App, INVENTOR

BY Victor J. Evans ATTORNEY

WITNESS:

July 26, 1932.  A. J. APP  1,869,234
PAN
Filed March 29, 1930  2 Sheets-Sheet 2
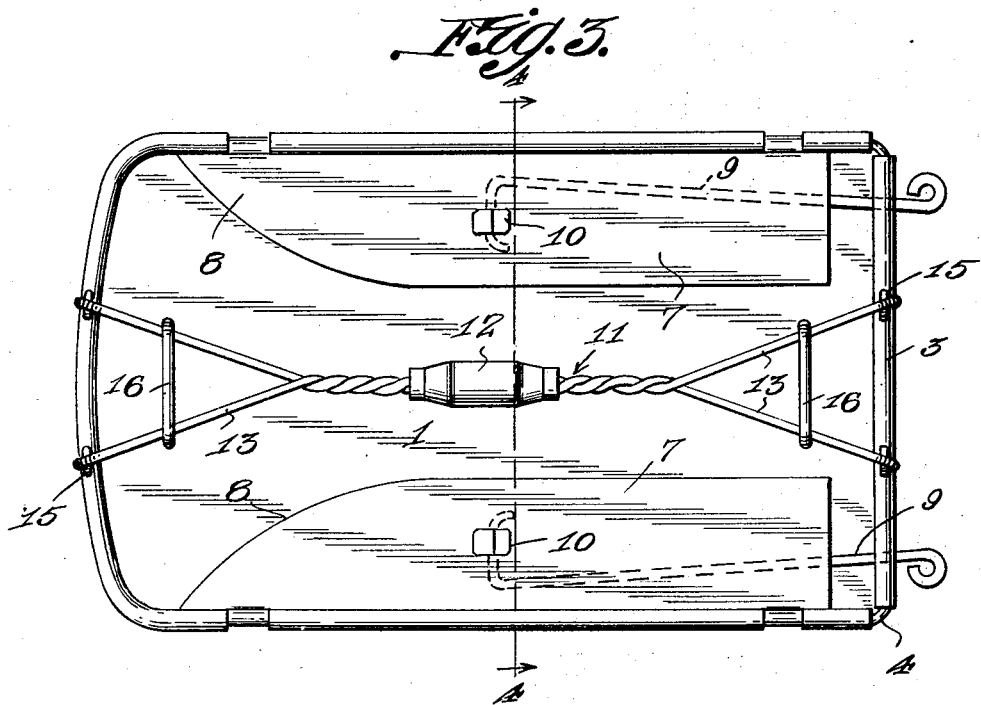
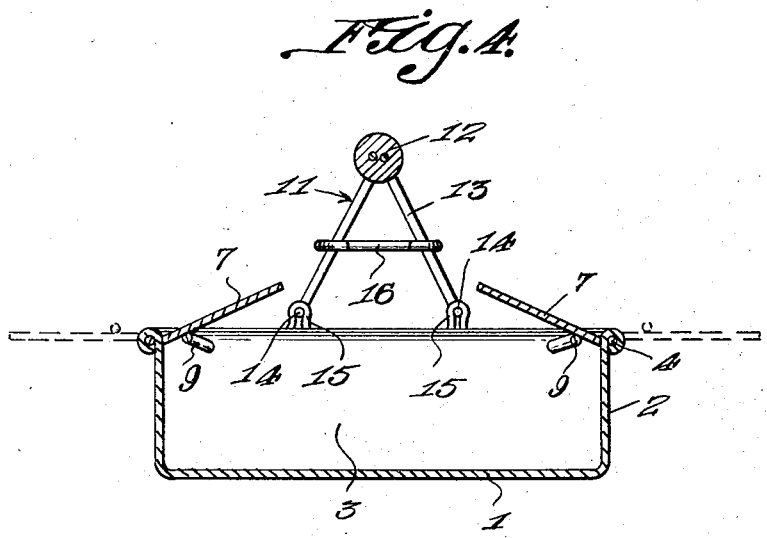
Andrew J. App,
INVENTOR
BY Victor J. Evans
ATTORNEY
WITNESS:

Patented July 26, 1932

1,869,234

UNITED STATES PATENT OFFICE

ANDREW J. APP, OF LOUISVILLE, KENTUCKY, ASSIGNOR OF ONE-HALF TO L. BIRKEL AND SONS, OF LOUISVILLE, KENTUCKY

PAN

Application filed March 29, 1930. Serial No. 440,108.

This invention relates to new and useful improvements in pans or receptacles and has for its primary object the provision of a device of the above stated character especially adapted to collect ashes in the ash pit of a furnace and permit the easy and quick removal of the ashes to a suitable container located foreign to the furnace without the necessity of shoveling or otherwise handling the ashes to cause scattering of the ashes or dust therefrom.

Another object of this invention is the provision of wings or panels to the pan or receptacle to direct the ashes therein when falling from the grate of the furnace and which may be positioned to aid in retaining the ashes in the pan or receptacle when removing it from the furnace and carrying the same to the ash collecting container.

A further object of this invention is the provision of a handle which permits the carrying of the pan or receptacle in one hand and which is removable and capable of being used as a hook for extracting the pan or receptacle from the furnace.

A still further object of this invention is the provision of a pan or receptacle of the above stated character, which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 3 is a top plan view illustrating the pan and handle positioned to carry the former with one hand.

Figure 4 is a sectional view taken on the line 4—4 of Figure 3.

Figure 1:
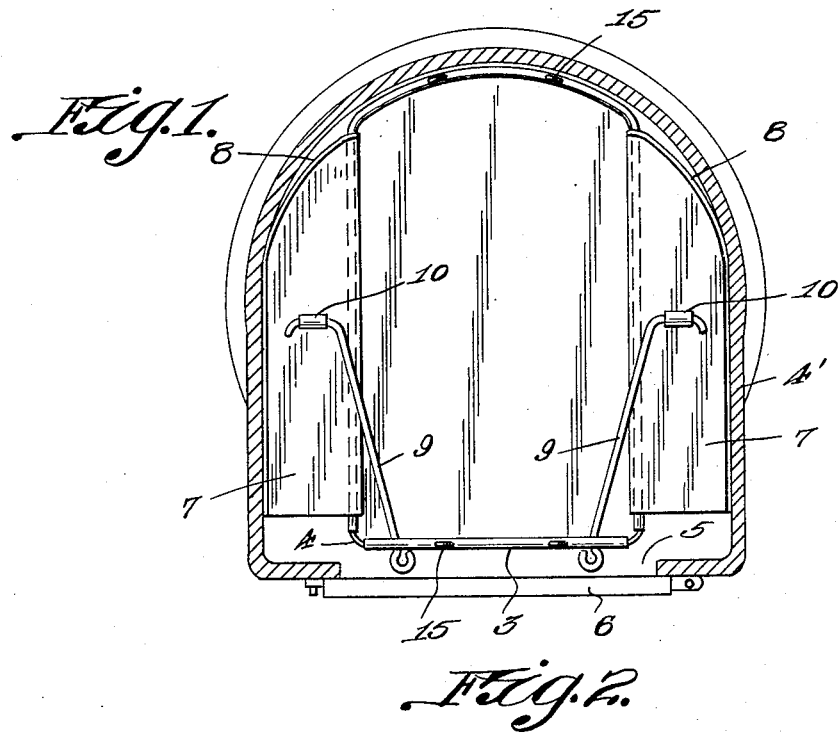
Figure 1 is a horizontal sectional view illustrating a pan constructed in accordance with my invention and positioned in the ash pit of a furnace.

Referring in detail to the drawings the numeral 1 indicates the bottom of the pan having the upstanding side and end walls 2 and 3 which have their upper free edges curved about a reinforcing band or element 4. One of the end walls is slightly curved as clearly shown in Figure 3 to conform to the curvature of the rear wall of an ash pit 4' which has the usual door-way 5 in its front wall closed by a hinged door 6. The pan 1 rests upon the bottom of the ash pit with the straight wall 3 disposed adjacent the door-way 5 as clearly shown in Figure 1. A pair of wings or panels 7 are hinged to the upper edges of the side walls and when the pan is positioned in the ash pit 4' of the furnace said wings or panels are swung upwardly and outwardly against the side walls of the ash pit to direct the ashes falling from the grate into the pan 1. The inner ends of the panels or wings 7 are cut away or curved as shown at 8 to conform to the contour of the side and rear wall of the ash pit 4. The panels or wings have extensions formed thereon which are curved or rolled to receive the band 4 within slots or notches formed in the side walls of the pan to hinge said wings or panels to permit them to be swung inwardly or outwardly of the pan as desired.

Operating rods 9 are slidably and rotatably mounted in the straight end wall 3 of the pan and have the inner end angularly related and journaled in brackets 10 secured to the panels or wings 7 and by moving the rods 9 endwise and permitting them to turn, the panels or wings may be swung inwardly or outwardly of the pan 1 as desired. The outer ends of the rods are bent to form finger grips.

Figure 2:
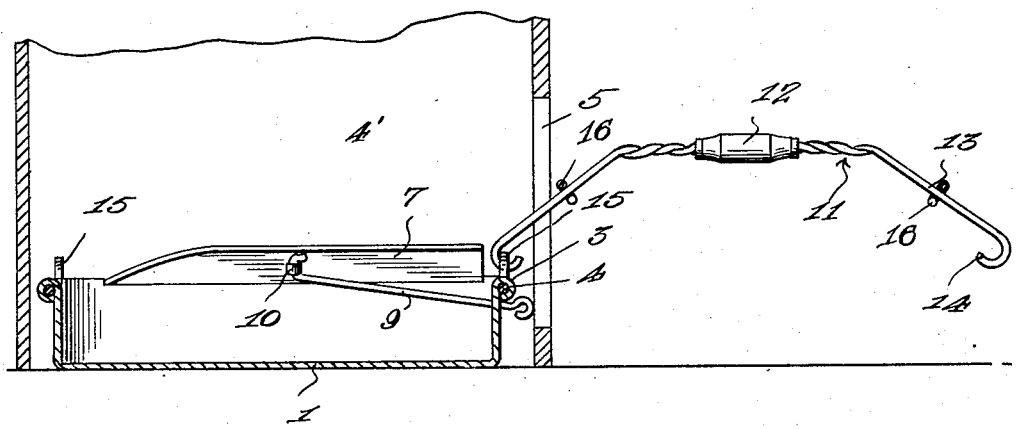
Figure 2 is a sectional view illustrating the handle positioned to extract the pan from the ash pit of the furnace.

A handle 11 having a hand grip 12 and diverging arms 13 is removably secured to the end wall 2 of the pan 1 by the hook-shaped ends 14 received in eyes 15 formed on the element 4 and extending through suitable slots in the end wall 3. Suitable braces 16 are positioned on the arms 13 to prevent said arms from moving relatively to each other. The handle 11 is preferably constructed from heavy gauge wire twisted about itself to form a portion to receive the hand grip 12 and then extended to provide the diverging arms 13. With the handle attached to the pan as shown in Figure 3, the latter can be conveniently carried in one hand. The handle 11 is removable from the pan and may be used as an extracting member for withdrawing the pan from the ash pit as shown in Figure 2.

In operation, the pan 1 is positioned in the ash pit as shown in Figure 1 with the wings or panels disposed upwardly and outwardly against the walls of the ash pit so as to direct the ashes into the pan and when it is desired to remove the ashes, the wings or panels are swung inwardly upon the ashes and the handle 11 is hooked into one of the eyes 15 to permit the easy withdrawal of the pan from the ash pit. After the pan has been completely removed from the ash pit, the handle is applied to the pan as shown in Figure 3 whereby the same may be easily carried in one hand for dumping into a suitable ash container (not shown) and which is usually located foreign to the furnace.

While I have shown and described the preferred embodiment of my invention, it will be understood that minor changes in construction, combination and arrangement of parts may be made without departing from the spirit and scope of the invention as claimed.

Having thus described my invention what I claim is:

A handle for ash pans of furnaces comprising a pair of members twisted about each other to provide a hand grip receiving portion with diverging arm portions at each end thereof and having the free ends bent downwardly and rearwardly to provide hooks for engagement with eyes of an ash pan, a hand grip having a bore to receive the hand grip portion and held against endwise movement thereon by the twisting of said members, and loop members slidable on the arm portions to move said arm portions toward and from each other for increasing and decreasing the binding action on the hooks on the eyes of the pan.

In testimony whereof I affix my signature.

ANDREW J. APP.